(No Model.)

J. G. JORY.
RURAL ADVERTISING SIGN.

No. 340,788. Patented Apr. 27, 1886.

Witnesses:
A. E. Eader.
Jns. E. Morris.

Inventor:
John G. Jory
By Chas. B. Mann
Attorney.

UNITED STATES PATENT OFFICE.

JOHN G. JORY, OF BALTIMORE, MARYLAND.

RURAL ADVERTISING-SIGN.

SPECIFICATION forming part of Letters Patent No. 340,788, dated April 27, 1886.

Application filed March 17, 1884. Serial No. 124,453. (No model.)

*To all whom it may concern:*

Be it known that I, JOHN G. JORY, a citizen of the United States, residing at Baltimore, State of Maryland, have invented certain new and useful Improvements in Rural Advertising-Signs, of which the following is a specification.

This invention relates to a rural advertising-sign, and has for its object to provide an economical and effective sign of large dimensions adapted for the country.

Rural advertising - signs designed to be especially effective are usually from twenty-five to one hundred or more feet in length, and embrace very large or bold letters. When such signs are built of wood alone along a line of a railroad, for instance, they require the labor of skilled workmen on the spot, are for this and other reasons very expensive, and, finally, are easily damaged by storms and other causes. The desideratum is a sign of such construction that all the parts, and especially those requiring the labor of skilled workmen, may be made at the factory, and the several parts comprising a complete sign to be of such character as to admit of being packed in small compass for shipment along the line of road where it is desired to advertise, and thereby the erection of signs of this description will be made both expeditious and economical.

Figure 1:
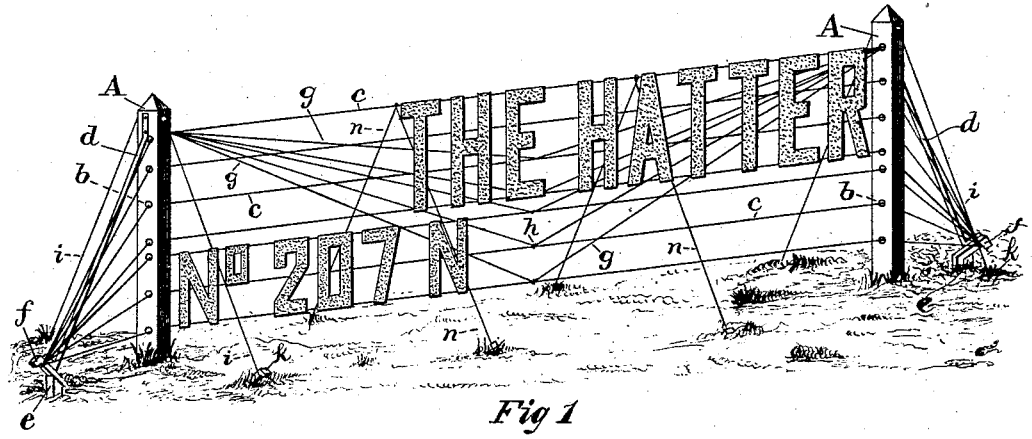
Figures 2, 3:
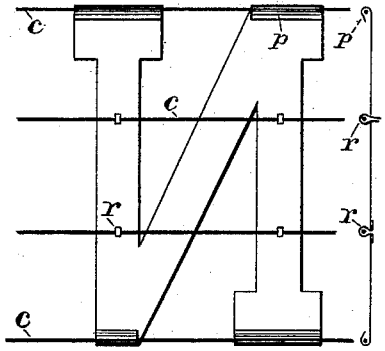
Figures 4, 5:
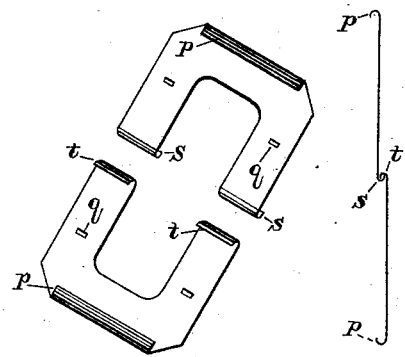
Figure 6:
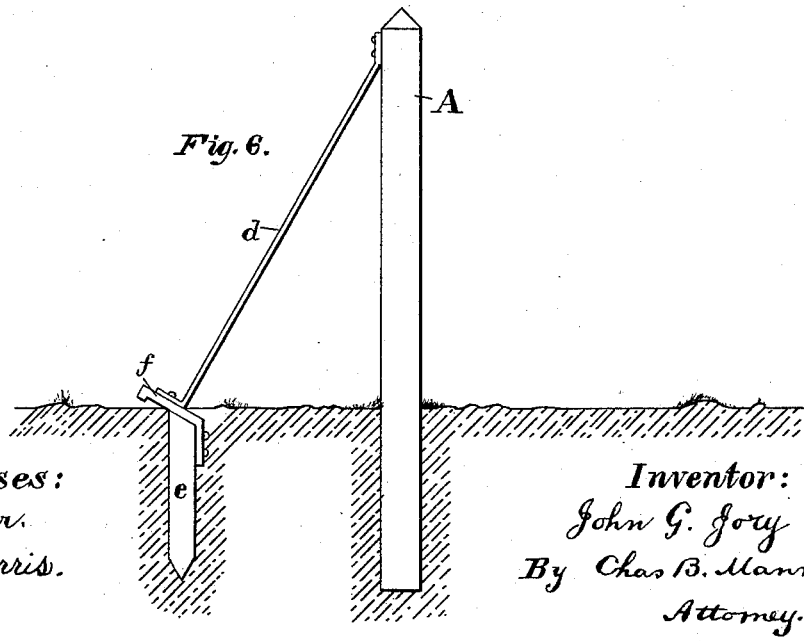

In the accompanying drawings, Figure 1 is a view of the improved sign. Fig. 2 shows the reverse or back side of a sheet-metal letter. Fig. 3 is an edge view of the same letter.
Fig. 4 is a reverse or back view of a sheet-metal letter made in two parts. Fig. 5 is an edge view of the same. Fig. 6 is a view showing in detail the supporting-post.

The letter A designates the two posts, which have holes $b$ bored for the passage of the wires $c$. The posts require to be planted in the ground in a substantial manner, and each post is stayed and braced by an iron bar, $d$, made fast to a stout stake, $e$, driven firmly or planted in the ground. An iron bar, $f$, is bent to form a hook of any suitable shape, and is bolted to the stake, the hook is stayed by the brace-bar $d$, and both brace-bar and hook are secured to the same stake. The wires $c$ pass through the holes $b$ in the posts, and are drawn taut and made fast to the hook $f$. Suspended truss-wires $g$ are made fast to the tops of the posts and depend or sag the lowest at the center, $h$, where each of said wires is attached to one of the tightly-drawn wires $c$ by a piece of wire (not shown) wrapped or tied about the two in a way readily understood, or by any suitable means. The suspended wires are so arranged that the one which sags the lowest is attached to the lowermost tightly-drawn wire, and the one which sags next to the lowest is attached to the second wire $c$ from the ground, and the next suspended wire is attached to the third tightly-drawn wire, and so on. In addition to the center fastening the suspended truss-wires may also be fastened to the others at points here and there where they cross. By this arrangement of suspended truss-wires attached to the tightly-drawn wires, and the sheet-metal letters, hereinafter described, secured thereto, great permanency is given to the sign. Guy-wires $i$ are secured to the top of each post and extend from opposite sides, and are made fast to stakes $k$, driven in the ground. Other guy-wires, $n$, are secured to the uppermost tightly-drawn wire $c$, and are in like manner made fast to stakes, and these assist to stay the sign from the force of the wind acting against the letters. The letters are composed of any suitable sheet metal. They are cut and shaped at the factory, and each letter is provided at the top and bottom with a flange, which is bent backward to form a hook, $p$, the upper one of which takes over one of the wires $c$, and the lower one under one of said wires. The letters also have slots or holes $q$, located at the predetermined points between the top and bottom whereat the tightly-drawn wires $c$ will come. When the letters are hooked onto these wires, the hooks $p$ are flattened down to clasp or pinch the wire by placing a suitable iron against one side and battering the other side with a hammer. Staple-shaped metal fasteners $r$ are first placed astride the wires $c$, and then are pushed through the slots $q$ in the letters, as indicated in Fig. 3. The ends of the staple-fasteners are then spread apart on the front side of the sheet-metal letter. This mode of securing the letters to the wires, besides serving to hold the letters on, gives stability to the whole wire structure by connecting the several wires.

In this class of signs letters of six or eight feet in height are frequently used. For several reasons, sheet-metal letters of this size would be impracticable, and I therefore provide for making large sheet-metal letters in two or more sections, as illustrated in Figs. 4 and 5. Fig. 4 represents the letter O, the upper section of which has at its bottom edge a hook, $s$, and the lower section has at its top edge a hook, $t$. In putting these letters up the upper section is first hooked by its hook $p$ onto a wire $c$, and then the lower section is hung to the upper section by the hook $t$ engaging with the hook $s$, as seen in Fig. 5. These hooks are then flattened or hammered together, and the letter is finally secured to the wires, as already described. The sheet-metal letters having been attached may then be painted by an ordinary unskilled laborer, and if luminous paint be used the letters will show at night as well as in day-time.

The letters of a sign of this character may be seen and will attract attention from either side, and for this and other reasons, some of which have been already indicated, this sign has advantages over other rural signs heretofore used.

Fasteners of other forms may be used than that designated by the letter $r$.

Having described my invention, I claim and desire to secure by Letters Patent of the United States—

1. A support for a rural sign, having in combination posts A, provided with holes $b$, a stake, $e$, driven in the ground at one side of each post, and each stake provided with a hook, $f$, bars $d$, each having one end braced against a post and the other end made fast to a hook-stake, and wire $c$, passed through the holes in the posts and each end made fast to one of the said hooks, and sheet-metal letters attached to the wires, as set forth.

2. A support for a rural sign, having in combination the posts, tightly-drawn wires extending between the posts, suspended truss-wires having each end made fast to a post, sagging between two posts and attached to one or more of the tightly-drawn wires, and sheet-metal letters attached to the wires, as set forth.

3. A rural sign having, in combination, the posts, tightly-drawn wires extending between the posts, and sheet-metal letters made in sections, the upper section of which has at its top a hook, $p$, and at its bottom a hook, $s$, and the lower section of which has at its top a hook, $t$, for engagement with the bottom hook of the upper section, whereby the upper section of the letter may be attached to the wire first, and then the lower section hung to the upper one, as set forth.

In testimony whereof I affix my signature in presence of two witnesses.

JOHN G. JORY.

Witnesses:
JNO. T. MADDOX,
JNO. E. MORRIS.